8058X
E. Rockwell.
Vault Light.
Patented Mar. 8. 1834.
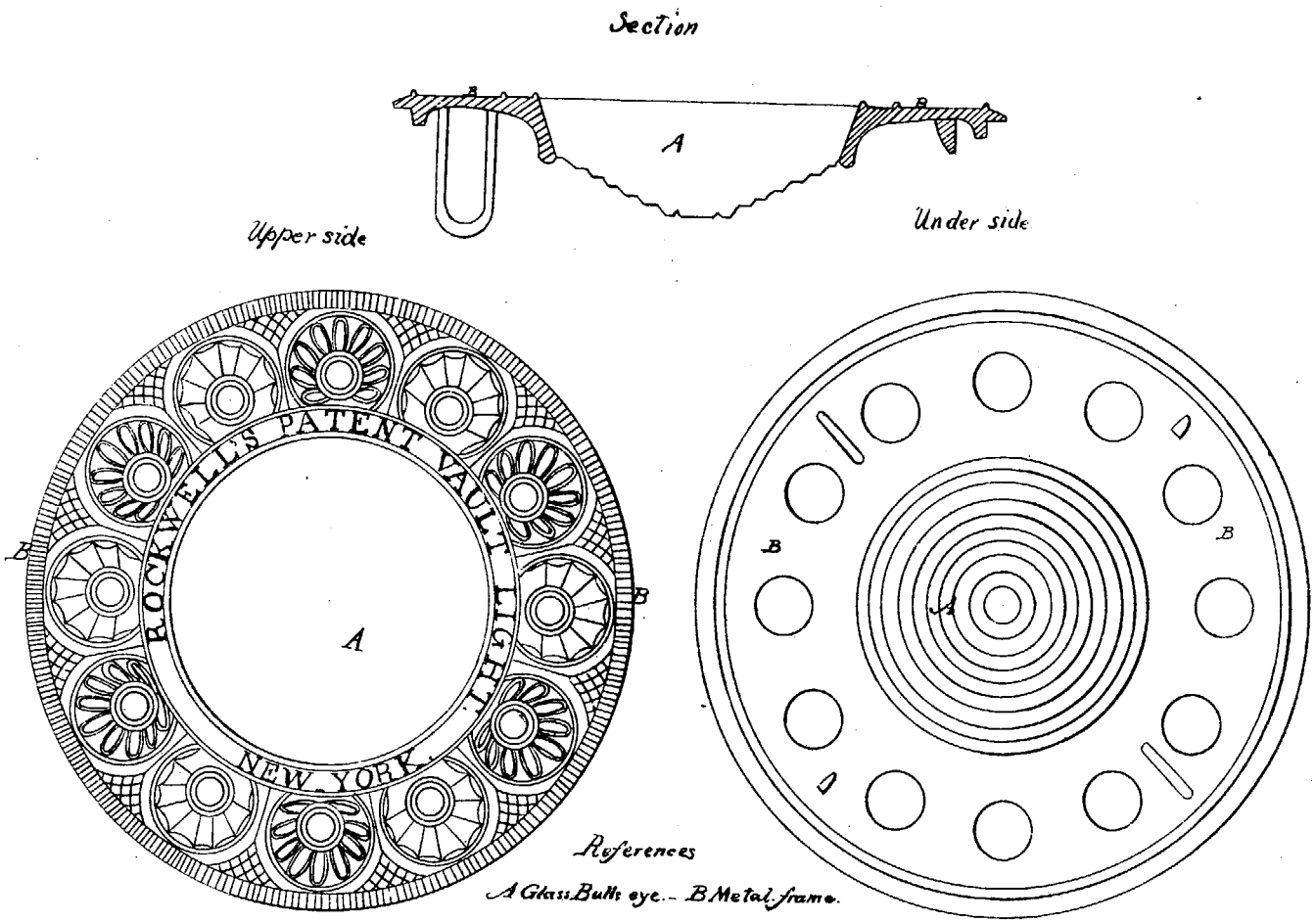

Edward Rockwell, of the City of N. York.
Letters Patent

The schedule referred to in these Letters Patent, and making part of the same, containing a description in the words of the said Edward Rockwell himself, of his improvement, entitled "Rockwells metallic rims for vault lights":

---

Be it known that I, Edward Rockwell, of the City, County, and State of New York have made an improvement in the useful arts, being a mode of enchasing circular oval, or other segments of glass, in cast iron or other metal, to admit light through vaults under pavements and other subteranean apartments requiring light from above. entitled "Rockwells enchased semi convex or bulls eye vault lights": which is described as follows — A piece of glass of any required figure, size and thickness being cast or otherwise formed flat or plane on one side, and raised or spherical on the other, forming a semi convex or semi plano figure -

An ornamented or plain frame, of cast iron or other metal of any size and figure, is cast, being the section of a sphere on the lower side to receive the spherical side of the glass which is placed downwards. or on the inner rim of this frame, about one sixteenth of an inch below the upper surface may be cast a ledge or edging upon which the glass may rest, the surface of the glass will also in this case be below the face of the castings, about one sixteenth of an inch —

The advantages to be obtained from the use of this kind of light is, that it can be placed in places where it is necessary to walk over it, without being liable to be broken, and is highly ornamented. For a further illustration of my invention I refer to the model and drawing of the same deposited in the Patent office —

The invention here claimed is the use of ornamental or plain cast metal frames or chases to protect semi plano lights for vessels decks, vaults under pavements and other subteranean apartments as above described: the glass being perfectly well protected: and the cast iron frame highly ornamental, and made of any shape, size, or of any metal, and to be used for all purposes.

Witnesses,
John Lentner
John P. Moore

Edward Rockwell

Drawing

[illegible]

(Patented March 8. 1834)